United States Patent [19]
Magill et al.

[11] Patent Number: 5,967,712
[45] Date of Patent: Oct. 19, 1999

[54] CUTTING TOOL FOR MACHINING BORES IN MATERIALS HAVING SPRING-BACK

[75] Inventors: William C. Magill, Mentor, Ohio; Gary D. Baldwin, Ligonier, Pa.; William B. Tunis, Puyallup, Wash.

[73] Assignee: Kennametal Inc., Latrobe, Pa.

[21] Appl. No.: 09/185,477

[22] Filed: Nov. 3, 1998

[51] Int. Cl.$^6$ .................................................. B23B 51/00
[52] U.S. Cl. ........................ 408/227; 408/199; 408/224; 408/230
[58] Field of Search ..................... 408/199, 224, 408/227, 229, 230, 223

[56] References Cited

U.S. PATENT DOCUMENTS

| | | | |
|---|---|---|---|
| 2,332,295 | 10/1943 | Bouchal | 408/230 |
| 3,665,801 | 5/1972 | Gutshall | 408/230 |
| 3,806,270 | 4/1974 | Tanner et al. . | |
| 3,977,807 | 8/1976 | Siddall . | |
| 4,080,093 | 3/1978 | Maier . | |
| 4,086,733 | 5/1978 | Vig | 408/230 |
| 4,116,580 | 9/1978 | Hall et al. | 408/230 |
| 4,143,723 | 3/1979 | Schmotzer | 408/230 |
| 4,222,690 | 9/1980 | Hosoi | 408/230 |
| 4,231,693 | 11/1980 | Kammeraad | 408/230 |
| 4,759,667 | 7/1988 | Brown . | |
| 5,725,338 | 3/1998 | Cabaret et al. . | |
| 5,795,111 | 8/1998 | Kress et al. . | |
| 5,855,458 | 1/1999 | Reynolds et al. | 408/230 |

FOREIGN PATENT DOCUMENTS

| | | |
|---|---|---|
| 19 21 677 | 9/1977 | Germany . |
| 55-90214 | 7/1980 | Japan . |
| 59-187421 | 10/1984 | Japan . |
| 63-185507 | 8/1988 | Japan . |
| 1764858A1 | 9/1992 | Russian Federation . |

*Primary Examiner*—Andrea L. Pitts
*Assistant Examiner*—Moncia Smith
*Attorney, Agent, or Firm*—John J. Prizzi

[57] ABSTRACT

A cutting tool such as a drill or reamer for machining a bore in a workpiece is provided with at least one chamfered cutting edge on its distal end having an enlarged radial extent. The chamfered edge is defined between a tapered leading end, and an undercut end, and has a radial extent about 2.5% greater than the radial extent of the shaft of the tool. At least 40% of the length of the chamfered edge is substantially parallel to the axis of rotation of the tool shaft. The tapered and radially enlarged geometry of the chamfered cutting edge advantageously allows the drill or reamer to machine a bore in a workpiece formed from materials having significant spring-back characteristics, such as aluminum, titanium, or nickel alloys without sticking or galling during the machining operation, thereby greatly increasing tool life.

22 Claims, 5 Drawing Sheets

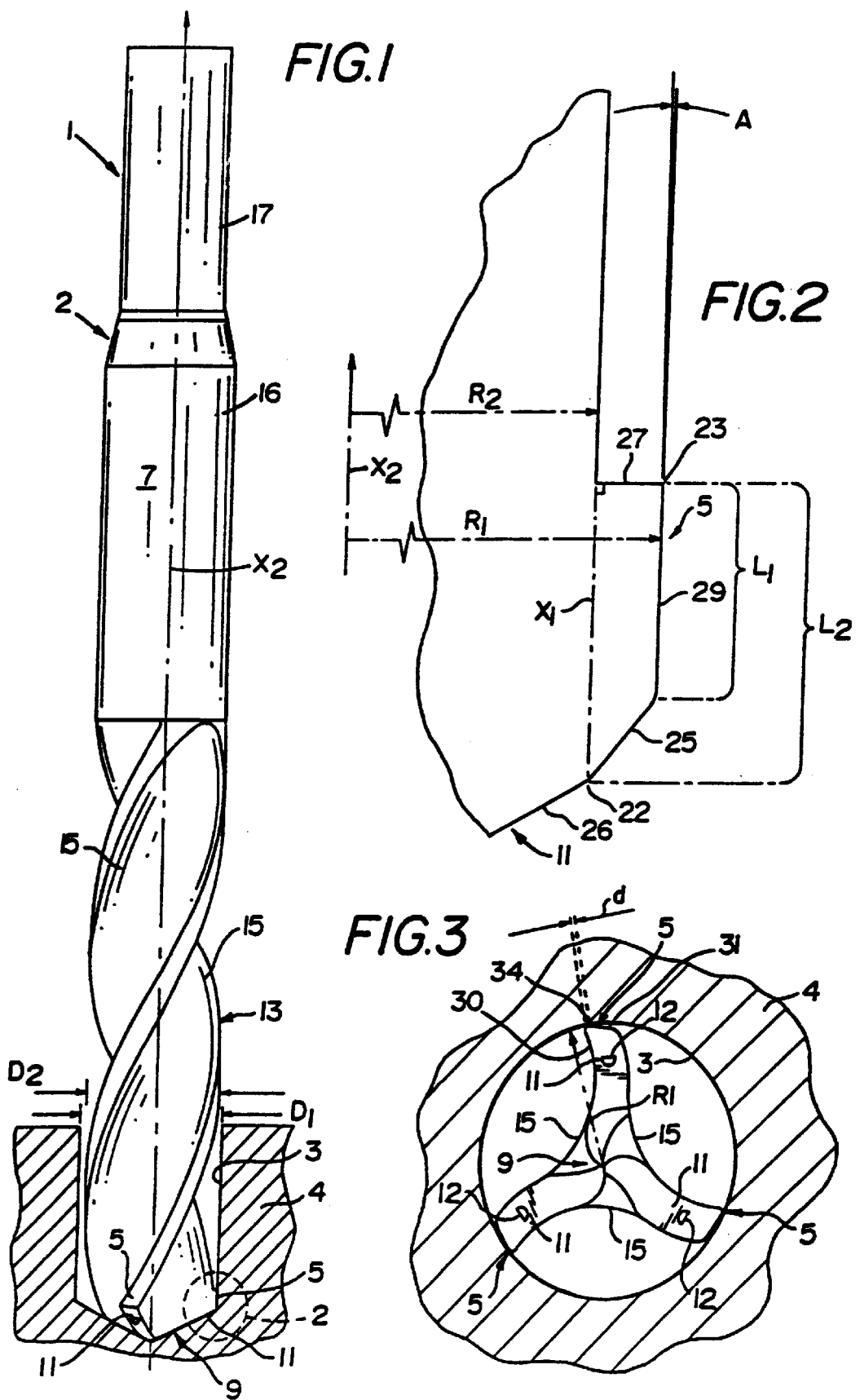

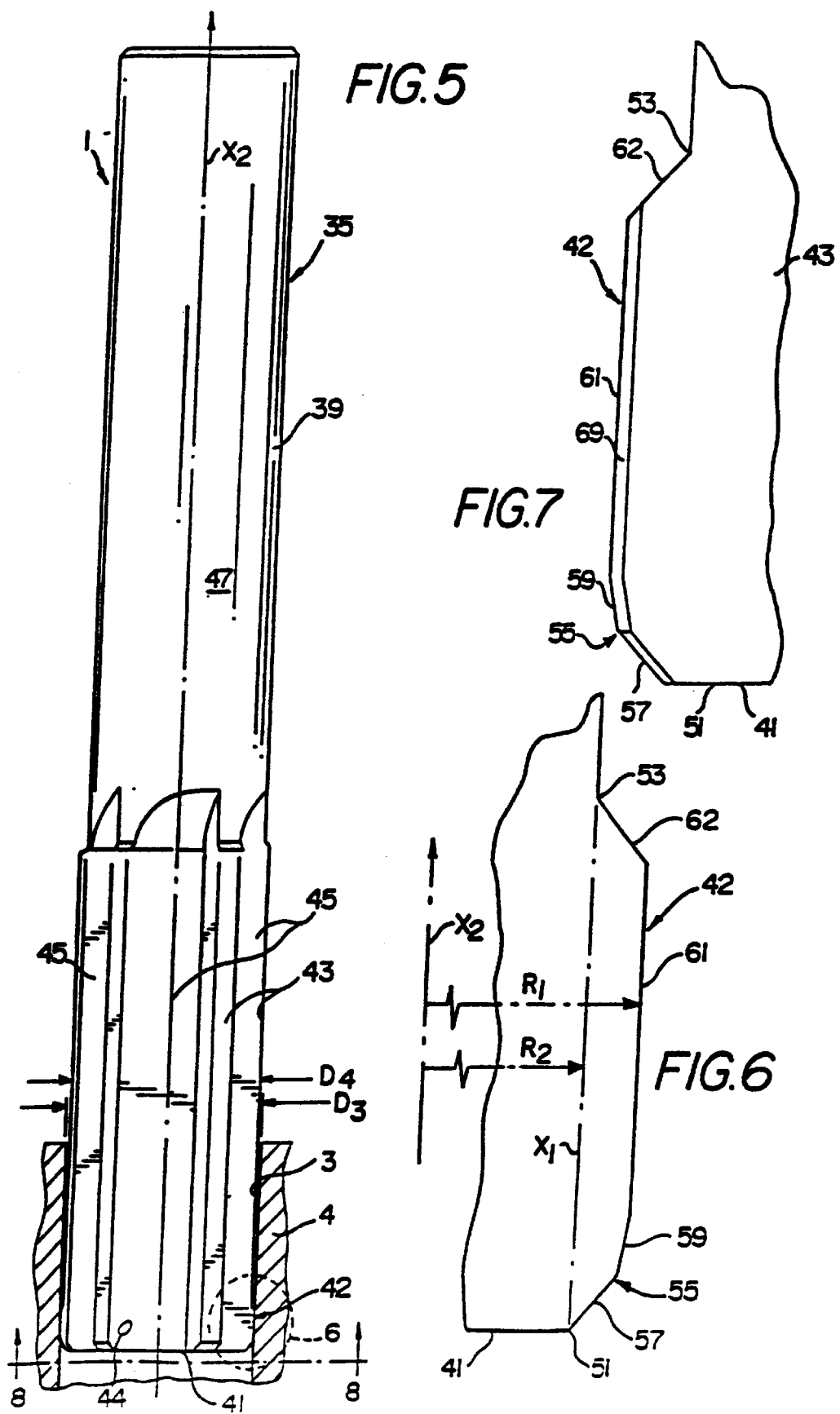

CUTTING TOOL FOR MACHINING BORES IN MATERIALS HAVING SPRING-BACK

BACKGROUND OF THE INVENTION

This invention generally relates to cutting tools for machining bores in workpieces, and is specifically concerned with drills and reamers for machining bores in metal materials having a relatively high degree of spring-back or memory without the occurrence of sticking or galling between the inner walls of the bore and the outer diameter of the tool.

Cutting tools such as drills or reamers for machining bores in metal workpieces are well known in the prior art. Prior art drills typically include a shaft that terminates in a drill point formed from two or more cutting blades which are radially oriented with respect to the shaft axis of rotation. The cutting blades are separated by helical flutes for removing chips and swarf generated as the cutting blades of the drill point penetrate the material to form a bore in a workpiece. The fluted portion of the drill terminates in a cylindrical or tapered shank that is gripped by a chuck that is turned by a motor. In order to insure that the outer diameter of the fluted portion of the drill does not rub against a bore being created by the drill point, it is known to slightly taper the fluted portion of such drills a few thousandths of an inch so that the diameter of the drill diminishes between the drill point and the drill shank.

Reamers are used to size and finish preexisting bores. To this end, they employ a plurality of straight, longitudinally oriented cutting blades disposed around the circumference of the tool shaft. The cutting blades are separated by straight flutes which receive and remove the metal chips and swarf generated by the reaming operation. Unlike drills, such prior art reamers are not tapered from their leading to their trailing ends, but maintain the same diameter throughout the longitudinal lengths of the cutting blades. The modest material removed during a reaming operation, in combination with the burnishability and small amount of spring-back associated with most metals, normally allows such reamers to perform their sizing and finishing function without undue friction or sticking.

While such prior art boring and reaming tools generally function well when machining workpieces formed from metals having relatively little spring-back (i.e., steel), the applicants have observed that problems arise when such tools are used to machine deep bores in metal alloys having large spring-back properties such as aluminum, titanium, and nickel alloys. Specifically, when a prior art drill is used to machine a deep bore in a workpiece formed from such an alloy, the inner diameter of the bore created by the drill point can actually spring back or radially contract a few thousandths of an inch behind the tip of the drill as it penetrates the workpiece, thereby ultimately bringing the inner walls of the bore into contact with the outer fluted surface of the drill. The heat created by the resulting frictional contact can not only cause the drill to seize up inside of the bore (and in some instances break) due to sticking and galling, but can sometimes, cause the workpiece to ignite when it is formed from a flammable metal such as titanium. Prior art reamers used in high spring-back materials can also generate undesirable amounts of friction during the reaming operation. Normally, the leading tip of the reamer does most of the work, widening the bore so that the tips of the reamer blades have only light contact with the wall of the bore. However, when such reamers are used to machine workpieces formed from high spring-back alloys, the consequent radial contraction of the bore behind the leading tip of the reamer can cause the tool to seize up and break due to the localized melting and subsequent galling that occurs between the outer tips of the reamer blades and the inner surface of the bore.

Clearly, there is a need for cutting tools for machining bores in workpieces formed from alloys having high spring-back characteristics. Ideally, such cutting tools would be capable of either forming or reaming a bore in a workpiece formed from such a material with little or no contact between the sides of the tool and the inner surface of the bore so as to eliminate any possibility of galling, seizing, and breakage. It would be desirable if such a tool had a relatively simple design which could be incorporated into prior art drills and reamers. Finally, such a cutting tool should have a long tool life, and be equally effective in boring or reaming materials formed from alloys having high or low spring-back characteristics.

SUMMARY OF THE INVENTION

Generally speaking, the invention is a cutting tool such as a drill or reamer for machining bores in a workpiece formed from a material with high spring-back properties, such as titanium, aluminum, or nickel alloys. The cutting tool comprises a rotatable shaft having a distal end with at least one chamfered cutting edge radially extending from its cutting blades an amount greater than the radial extent of the balance of the shaft. The chamfered cutting edge has a length along the axis of rotation which is defined between a leading end which includes a taper, and a trailing end defined by an undercut. The radial extent of the cutting edge is between about 1% and 4% of an outer diameter of the shank, and preferably about 2.5%. Between about 30% and 60% of the length of the chamfered cutting edge is substantially parallel to the axis of rotation of the shaft. The length of the chamfered edge is preferably at least 0.050 inches to allow multiple sharpening of the front end of the tool, and may be as long as 0.24 inches.

When the cutting tool is a drill, the leading end of each chamfered cutting edge is tapered at a 45° angle, and the side of the chamfered edge that is substantially parallel to the tool axis of rotation may include a slight back taper of less than 1°. In the preferred embodiment, the back taper is 0.2° or less with respect to the axis. The undercut is defined by a straight back edge which is substantially orthogonal with respect to the axis of rotation. To minimize friction between the blade of the drill point and the walls of the bore being made in the workpiece, the circumferential extent of each of the chamfered cutting edges extending from the drill blades is only between about 0.30% and 0.70% and preferably about 0.4% of the tool circumference.

When the cutting tool is a reamer, the undercut end is defined by a substantially straight back edge that is oriented between about 35° and 55° with respect to the axis of rotation. A plurality of reamer blades is disposed around a circumference of the shaft, each of which is separated from the other by a plurality of flutes which are parallel with respect to the axis of rotation. Each of the reamer blades terminates at its distal end in the previously-described chamfered cutting edge. To minimize friction between the reamer blade and a bore of a workpiece, the circumferential extent of each of the chamfered cutting edges disposed on the distal ends of the reamer blades is only between about 0.30% and 0.70% of the tool circumference. Finally, while the leading end of each of the chamfered cutting edges is initially tapered at a 45° angle, an additional 10° transition taper is provided between the 45° front taper and the side portion of the edge that is parallel to the axis of rotation.

The tool advantageously provides a smooth cutting action in a workpiece formed from a material having a significant amount of spring-back or memory, whether the machining operation is the creation of or reaming of a bore. The enlarged outer diameter of the tool creates a sufficient amount of clearance between the inner walls of the resulting bore and the outer diameter of the tool shank so that the shank does not stick or gall on the walls of the bore as the distal end of the tool penetrates the workpiece. The relatively simple creation of the chamfered cutting edges by means of an undercut on a back side and a taper on a front side of the tool allows the invention to be easily incorporated into existing drills and reamers. The small marginal areas of the chamfered edges reduces friction and cutting forces, and enhances tool life. The tool may be used in materials having small or large spring-back characteristics.

BRIEF DESCRIPTION OF THE DRAWINGS

FIG. 1 is a side view of a drill incorporating the chamfered edges of the invention shown boring a hole in a workpiece;

FIG. 2 is an enlargement of the circled area of FIG. 1, illustrating a chamfered edge of the invention;

FIG. 3 is a front view of the drill illustrated in FIG. 1 illustrating the drill tip, and the marginal contact between the chamfered edges of the invention and the inner walls of a bore;

FIG. 5 is a side view of a reamer incorporating the chamfered edges of the invention in the process of finishing a bore in a workpiece;

FIG. 6 is an enlargement of the circled area of FIG. 5, illustrating the chamfered edge of the invention;

FIG. 7 is a back view of the chamfered edge of FIG. 6;

DETAILED DESCRIPTION OF THE PREFERRED EMBODIMENT

Figure 4:
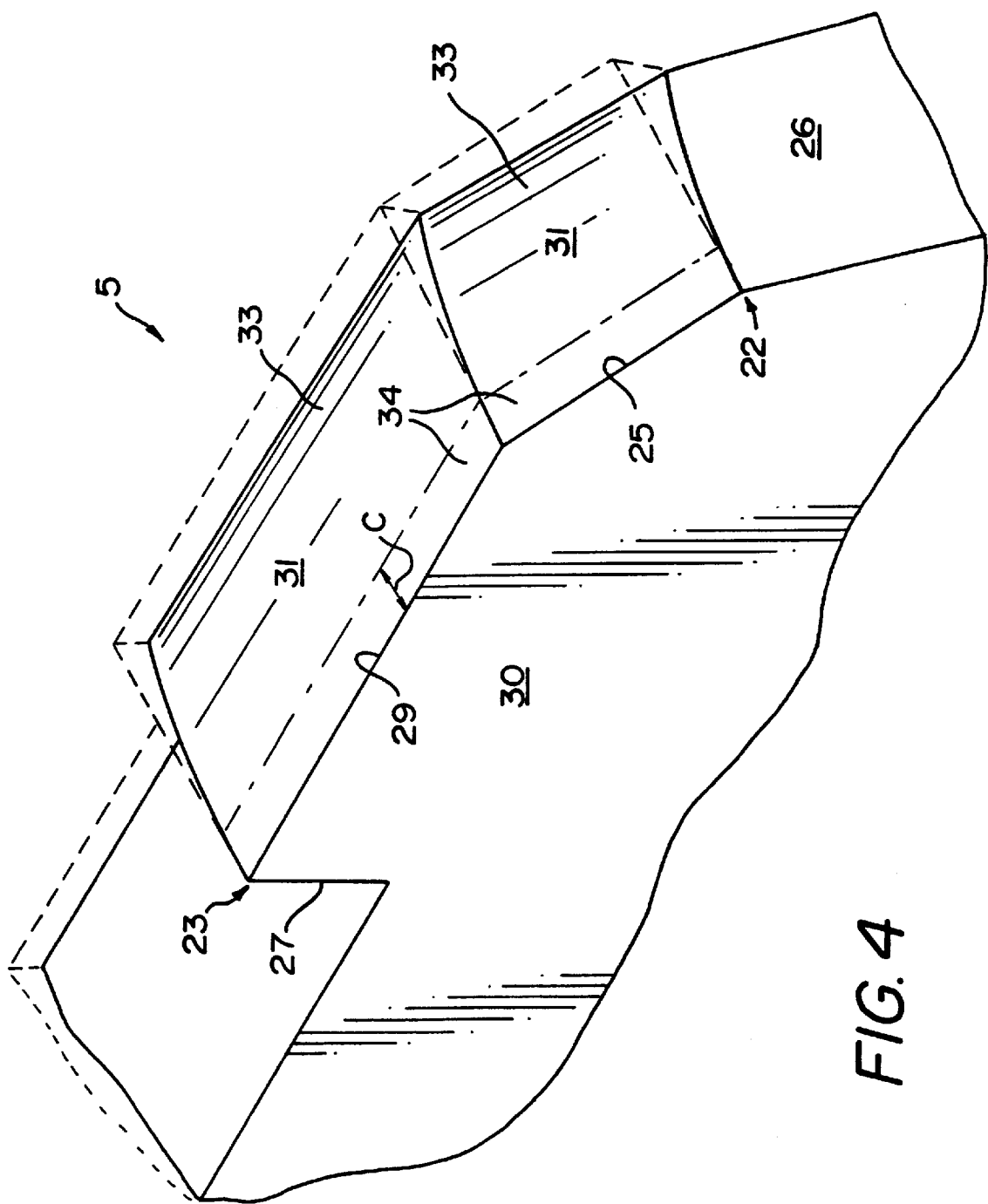
FIG. 4 is an isometric view of the chamfered edge of FIG. 2, illustrating in particular how the side of the edge is beveled to reduce the marginal contact area between the chamfered edge and a bore being created in a workpiece.

With reference now to FIGS. 1 and 2, wherein like numbers designate like components throughout all of the several Figures, the invention is a cutting tool 1 such as a drill 2 for producing a bore 3 in a workpiece 4 that includes chamfered edges 5. These edges 5 radially extend from the cutting blades of the drill 2 in order to prevent the tool 1 from sticking or galling in a manner that will become evident hereinafter. In the preferred embodiment, the cutting tool (whether it be a drill 2 or reamer 35) is integrally formed from a solid piece of, for example, high speed tool steel or other hard, wear-resistant material such as a cemented (cobalt) tungsten carbide.

The drill 2 includes a rotatable shaft 7 having a drill point 9 at its leading end. With reference now to FIGS. 1 and 3, the drill point 9 is formed from the convergence of three cutting blades 11 angularly spaced apart a uniform 120°. Each of the blades 11 has a coolant bore 12 for conducting pressurized liquid coolant to the blades 11 and the workpiece 4 during a cutting operation. In small diameter drills in accordance with the present invention, the coolant bores 12 may be absent. The rotatable shaft 7 further has a fluted portion 13 extending backwardly from its leading end that includes helical flutes 15 for aiding in the expulsion of chips and swarf and other material removed by the edges of the cutting blades 11 during a boring operation. The helical flutes 15 terminate in a cylindrical portion 16 as shown. The trailing end of the drill 3 includes a shank portion 17 adapted to be inserted into the mouth of a chuck (not shown) of a motorized turning tool that both rotates and advances the drill 3 with respect to the workpiece 4.

With reference in particular to FIG. 2, each of the chamfered edges 5 includes a leading end 22 and an undercut end 23 defined by a diameter-reducing undercut that extends backward from end 23. The undercut forms a straight back edge 27 which, when the invention is applied to a drill 2, is preferably orthogonal with respect to a line X1 parallel to the axis of rotation X2 of the drill 2. As may best be seen with respect to FIG. 1, the undercut has the effect of reducing the diameter D1 of the drill 1 behind its leading end to a smaller diameter D2 at all points behind the back edge 27. The relatively larger diameter D1 of the drill 2 in the vicinity of the chamfered edges 5 has the advantageous effect of rendering the inner diameter of the bore 3 to a diameter which is large enough to prevent the rest of the smaller diametered D2 shaft 7 of the drill 2 from coming into contact with the bore 3, even when the material forming the workpiece 4 has a large amount of spring-back and the drill 2 penetrates the workpiece 4 to its maximum extent.

However, in order to best attain the non-sticking advantages of the invention while maximizing tool life, it is important that the difference between the radii R1 and R2 of the diameters D1 and D2 be quite small, i.e., on the order of between about 1.5% and 4%. Stated in different terms, the radial extent R1 of the outer diameter defined by the chamfered edges 5 should be between 1.5% and 4% greater than the radial extent R2 defined by the balance of the rotatable shaft 7 of the drill 2. If radial extent R1 is not at least 1.5% greater than the radial extent R2, the inner diameter of the bore 3 created by the chamfered edge 5 may not be sufficiently large enough to avoid contact with the fluted portion 13 of the drill 2 as the drill 2 penetrates the workpiece 4 when the workpiece 4 is formed from a metal having a high degree of spring-back. On the other hand, if the radial extent R1 of the chamfered edge 5 is more than 4% of the radial extent R2 of the balance of the tool 1, then the chamfered edge 5 may be prone to chipping or breaking as a result of the greater amount of shear forces occurring along line X1 as the drill 2 penetrates the workpiece 4. In the preferred embodiment, the radial extent R1 defined by the chamfered edge 5 is 2.5% greater than the radial extent R2 defined by the balance of the shaft 7 of the tool 2.

With reference now to FIGS. 2 and 3, each of the chamfered edges 5 includes a straight side edge 29 which is substantially parallel to a line X1 parallel to the axis of rotation X2 of the drill 2. In the preferred embodiment, side edge 29 is not completely parallel to line X1; rather, side edge 29 is back-tapered at a very small angle A that is inclined between about 0.1° and 0.5° with respect to a line X1 parallel to the axis of rotation of the drill 2. In the preferred embodiment, angle A is 0.2°. Such a very slight back taper in combination with the provision of the tapered edge 25 (which is inclined at an angle of about 45° relative to side edge 29) has been found to enhance the cutting action of the drill 2 by allowing the chamfered edges 5 to more easily penetrate the workpiece 5. In the preferred embodiment, the axial length L1 of the straight side edge 29 is at least 40% of the overall axial length L2 of the chamfered edge 5, and more preferably at least 60% of the overall axial length L2. The overall axial length L2 is preferably never greater than 0.25 inches in order to avoid excessive friction between the chamfered cutting edges 5 and the inner walls of the bore 3 created by the drill 2.

FIGS. 3 and 4 illustrate how the side edge 29 and tapered edge 25 of each of the chamfered edges 5 is formed by the intersection of a radially oriented wall 30 and a circumferential wall 31. The circumferential wall 31 includes a bevel 33 (best seen in FIG. 4) in order to limit the marginal contact area 34 between the chamfered cutting edges 5 and the workpiece 4. In the preferred embodiment, the bevel 33 is dimensioned so that the ratio between the circumference of the outer diameter defined by the rotating edges 5 and the circumferential length C of the marginal contact area 34 is between about 0.3% and 0.7%, and most preferably about 0.4%. Such a relatively small marginal contact length C reduces the marginal contact area 34 between the chamfered edges 5 and the walls of the bore 3 being machined in a workpiece 4, and substantially reduces the amount of friction generated between the chamfered edges 5 and the workpiece 4. Such a reduction in friction not only reduces cutting forces and extends the life of the cutting tool 1, but also reduces the danger of igniting a workpiece 4 formed from a flammable metal, such as titanium.

FIGS. 5, 6, and 7 illustrate how the invention may be applied to a cutting tool such as a reamer 35. Reamer 35 includes a rotatable shaft 39 having a distal end 41 that includes the chamfered edges 42 of the invention. The chamfered edges 42 extend from a plurality of cutting blades 43 irregularly spaced around the circumference of the shaft 39. Optionally, some or all of the blades 43 may have a coolant bore 44 for conducting a pressurized liquid coolant onto the blades 43 and a workpiece 4. The cutting blades 43 are separated by longitudinal flutes 45 which, like the flutes 15 of the drill 2, serve to expel metal chips and swarf during the sizing and machining of a bore 3. The flutes 45 terminate in a cylindrical shank portion 47 of the shaft 39. In use, the free end of the shank portion 47 is gripped by the chuck of a motor operated turning tool that rotates and advances the distal end 41 of the reamer 35 into the bore 3 of a workpiece 4.

With specific reference to FIGS. 6 and 7, the chamfered edges 42 are defined between a leading end 51 and an undercut end 53. The leading end 51 includes a tapered edge 55. While most of the tapered edge 55 is defined by a taper 57 that is oriented at a 45° angle with respect to a line X1 that is parallel to the axis of rotation X2 of the reamer 35, edge 55 also includes a 10° taper 59 that joins an end of the 45° taper 57 into side edge 61. Such a dual tapering of the edge 55 allows the reamer 35 to be more smoothly fed into a bore 3 during a sizing and machining operation. The undercut 53 of each of the chamfered edges 42 terminates in a back edge 62 which, in contrast to the back edge 27 associated with the drill 2, is back tapered at a 45° angle.

As is best understood with respect to FIG. 6, the radial extent R1 defined by the side edge 61 of the chamfered edges 42 is between about 1.5% and 4% greater than the radial extent R2 of the balance of the reamer 35. Additionally, the length of the side edge 61 is at least 40% of the overall length of the chamfered edge 42, and is preferably at least 60%. Finally, the overall length of each of the edges 42 is no more than 0.25 inches, and is preferably on the order of 0.20 inches. Such dimensioning minimizes the amount of friction between the chamfered edges 42 and the inner walls of a bore 3 being machined while at the same time leaving enough overall length to allow the cutting blades 43 of the reamer 35 to be reground and resharpened several times.

Figure 8:
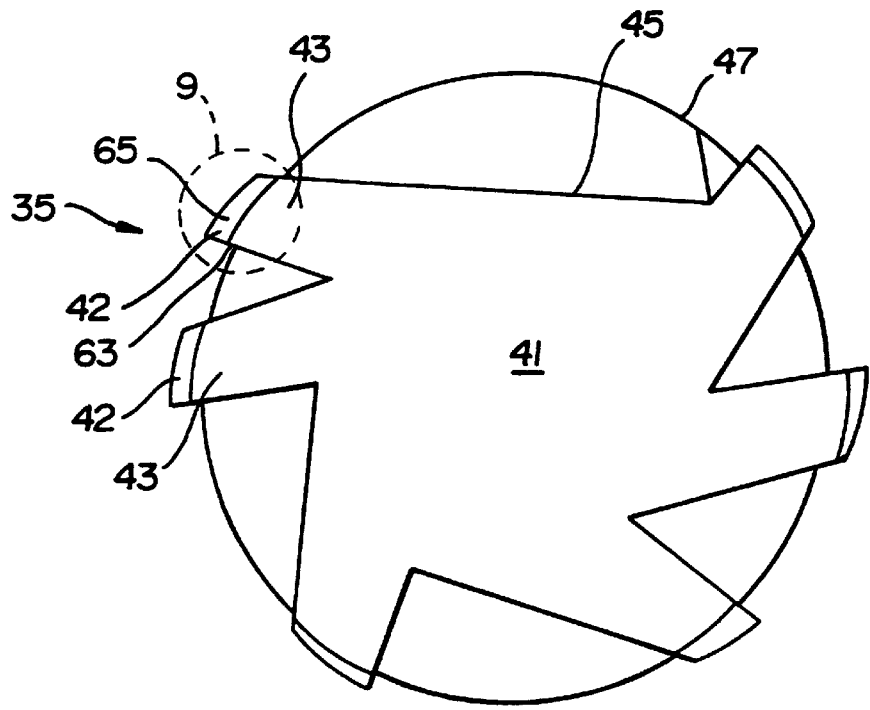
FIG. 8 is a front view of the reamer illustrated in FIG. 5 along the line 8—8.
Figure 9:
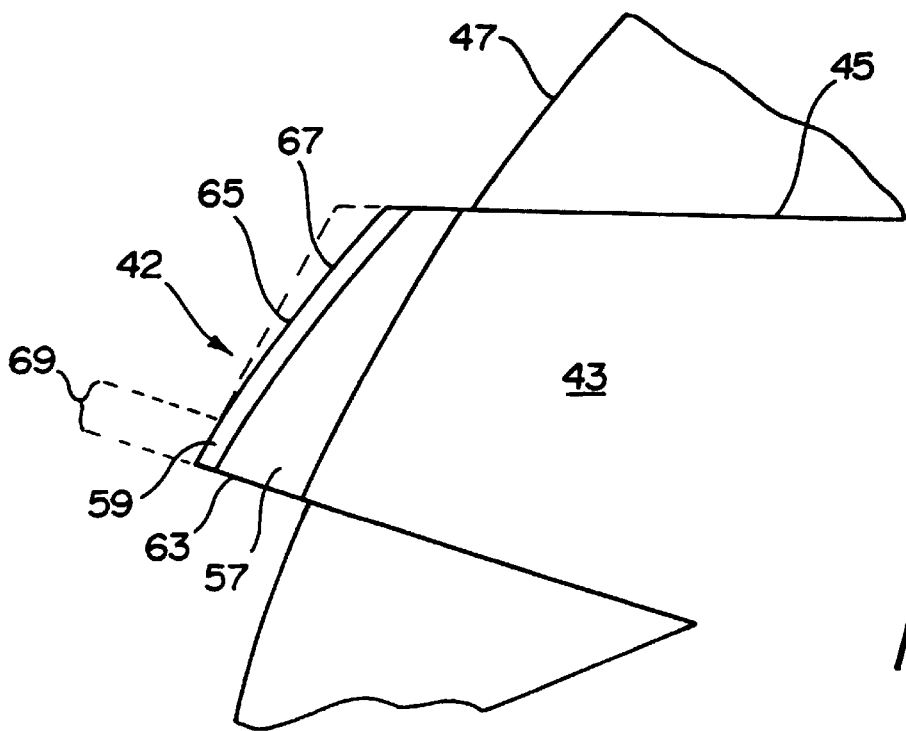
FIG. 9 is an enlargement of the circled end of the cutting blade illustrated in FIG. 8.
Figure 10:
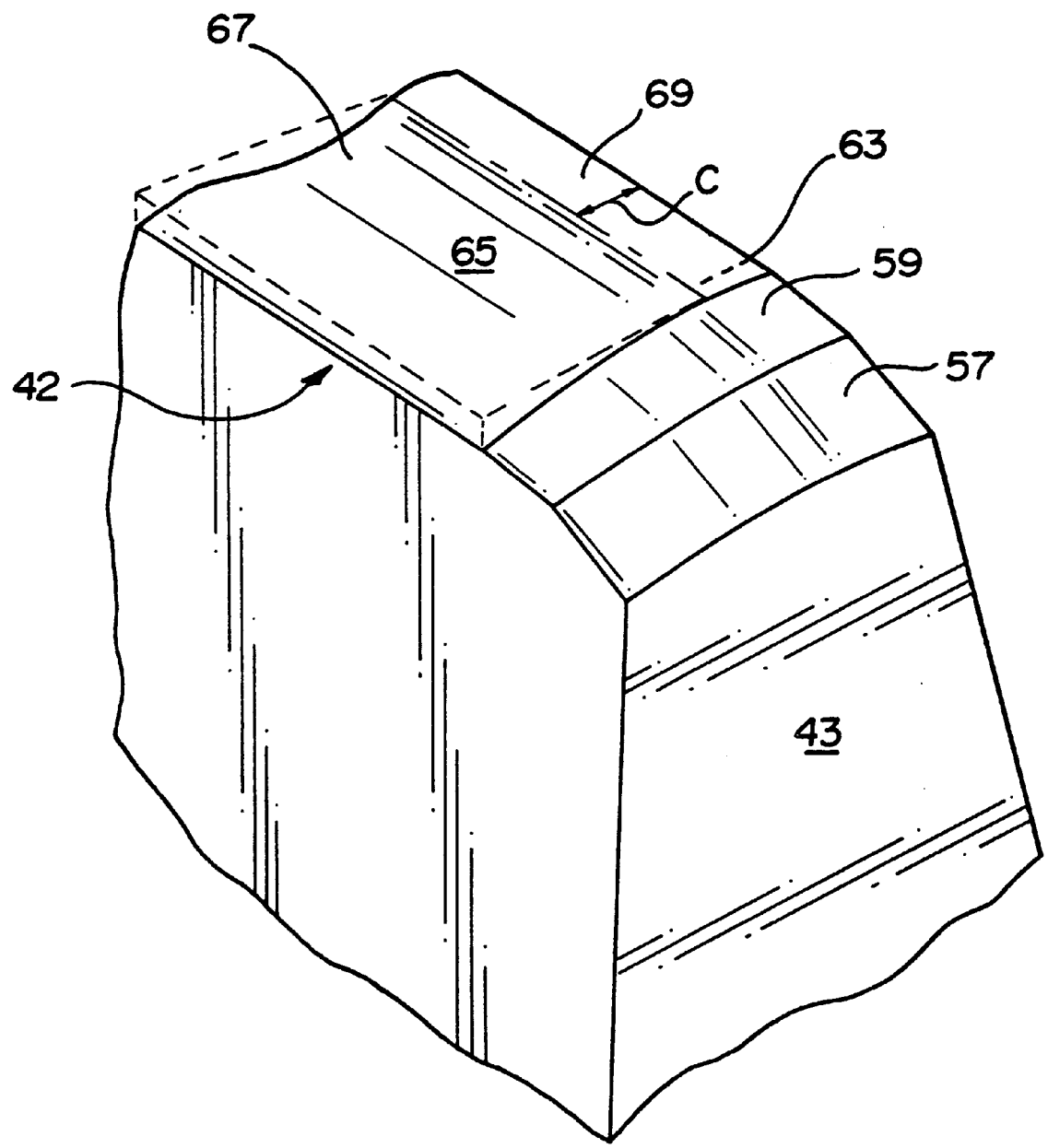
FIG. 10 is an isometric view of the leading end of the chamfered edge shown in FIG. 6 illustrating how the side of the chamfered edge is beveled in order to reduce the marginal contact area that engages a bore being machined by the reamer.

With reference now to FIGS. 8, 9, and 10, side edge 61, which defines the principal cutting edge of the chamfered edges 42, is formed by the intersection of a radial wall 63 and a circumferential wall 65. A bevel 67 is provided to reduce the marginal contact area 69 between each of cutting blades 43, and the inner wall of a bore 3 being machined. As was the case with the drill 2, the circumferential extent C of the marginal contact area 69 is between about 0.3% and 0.7% of the entire circumference defined by the rotating chamfered edges 42, and is most preferably 0.4%. Such dimensioning minimizes cutting forces between the chamfered edges 42 and the inner walls of the bore 3 being machined, and further advantageously minimizes the amount of friction-generated heat during a machining operation.

While this invention has been described with respect to two preferred embodiments, the chamfered edges 5,42 may be applied to virtually any cutting tool used to create or machine bores in workpieces. Different modifications, additions, and variations of the invention will become evident to those persons of ordinary skill in the art. All such modifications, additions, and variations are intended to be encompassed within the scope of this patent, which is limited only by the claims appended hereto.

What is claimed is:

1. A cutting tool for machining a bore in a workpiece, comprising a rotatable shaft having an outer diameter including a distal end with at least one chamfered cutting edge that initially engages a workpiece, said chamfered cutting edge having a length substantially parallel to an axis of rotation of said shaft defined between a leading end and an undercut end, said edge further having a radial extent from said axis that is no more than 4% greater than a radial extent of the balance of said shaft, and being tapered between said leading end and a central portion of said edge.

2. The cutting tool defined in claim 1, wherein at least a portion of said length of said chamfered cutting edge is substantially parallel to said axis of rotation.

3. The cutting tool defined in claim 1, wherein at least about 30% of said length of said chamfered cutting edge is substantially parallel to said axis of rotation.

4. The cutting tool defined of claim 1, wherein said cutting tool is particularly adapted for machining a bore in a metal having a spring-back property.

5. The cutting tool defined in claim 4, wherein said metal is one of the group consisting of aluminum alloys, titanium alloys, and nickel alloys.

6. The cutting tool defined in claim 4, wherein said chamfered cutting edge constitutes a means for preventing sticking from occurring between the walls of a bore in said workpiece and said balance of said rotatable shaft.

7. The cutting tool defined in claim 1, wherein said cutting tool is one of the group consisting of a drill and a reamer.

8. The cutting tool defined in claim 1, wherein said length of said chamfered cutting edge is between about 0.05 and 0.24 inches to allow multiple sharpening regrindings of the edge.

9. The cutting tool defined in claim 1, wherein the angle of said taper of said edge is between about 30° and 60° relative to said axis of rotation.

10. A cutting tool for machining a bore in a workpiece, comprising a rotatable shaft having an outer diameter including a distal end with at least one chamfered cutting edge that initially engages said workpiece to prevent the balance of said shaft from sticking in said workpiece, said chamfered cutting edge having a length defined between a tapered leading end and an undercut end, wherein at least a portion of said length of said cutting edge is substantially parallel to a shaft axis of rotation, and wherein said parallel portion of said chamfered edge has a radial extent from said axis of rotation that is between about 1% and 4% greater than a radial extent of the balance of said rotatable shaft.

11. The cutting tool defined in claim 10, wherein said substantially parallel portion of said chamfered edge is at least about 30% of said length of said chamfered edge.

12. The cutting tool defined in claim 10, wherein said leading end is tapered at between about 35° and 55° with respect to said axis of rotation.

13. The cutting tool defined in claim 10, wherein said cutting tool is a drill, and said substantially parallel portion of said edge is back tapered with respect to an axis of rotation of said shaft no more than about 1°.

14. The cutting tool defined in claim 13, wherein said undercut end is defined by a substantially straight back edge that is oriented approximately orthogonal with respect to said axis of rotation.

15. The cutting tool defined in claim 10, wherein each of said chamfered edges has a marginal extent that is between about 0.30% and 0.70% of a circumference defined around said distal end of said tool.

16. The cutting tool defined in claim 10, wherein said cutting tool is a reamer, and said undercut end is defined by a substantially straight back edge that is oriented between about 35° and 55° with respect to said axis of rotation.

17. The cutting tool defined in claim 16, wherein said reamer includes a plurality of reamer blades disposed around a circumference of said shaft, each of said reamer blades terminating at its distal end in said chamfered cutting edge.

18. The cutting tool defined in claim 17, wherein the ratio of the circumferential length of an outer diameter defined by said rotating shaft and one of said chamfered cutting edges is between about 0.3% and 0.7%.

19. The cutting tool defined in claim 1, wherein said distal end of said shaft terminates in a distal edge, and said taper of said leading end of said chamfered cutting edge intersects said distal edge at an angle.

20. The cutting tool defined in claim 19, wherein said radial extent of said chamfered cutting edge is between about 1% and 4% greater than a radial extent of the balance of said rotatable shaft.

21. The cutting tool defined in claim 19, wherein said distal edge defines a cutting blade.

22. The cutting tool defined in claim 19, wherein said distal edge defines a leading end of a reamer.

* * * * *